No. 841,239. PATENTED JAN. 15, 1907.
E. R. FOUTS.
MOTOR VEHICLE.
APPLICATION FILED APR. 28, 1906.
2 SHEETS—SHEET 2.
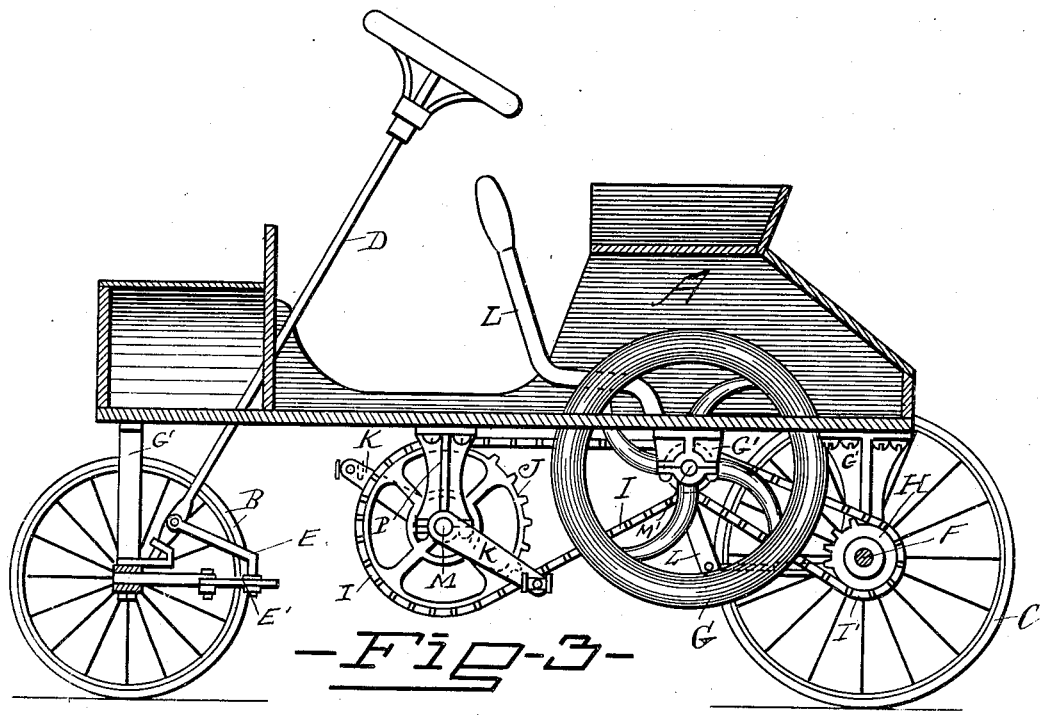
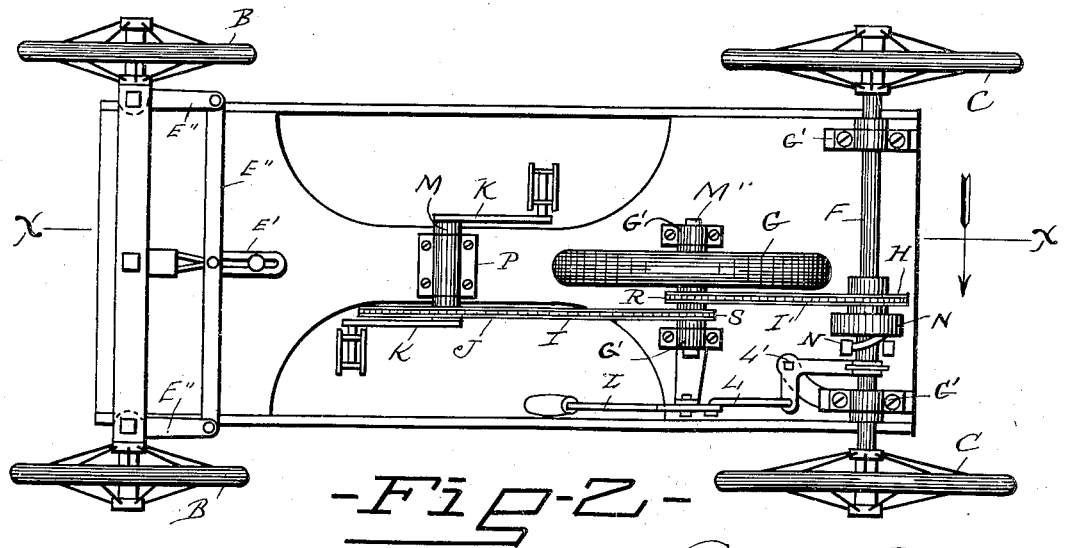

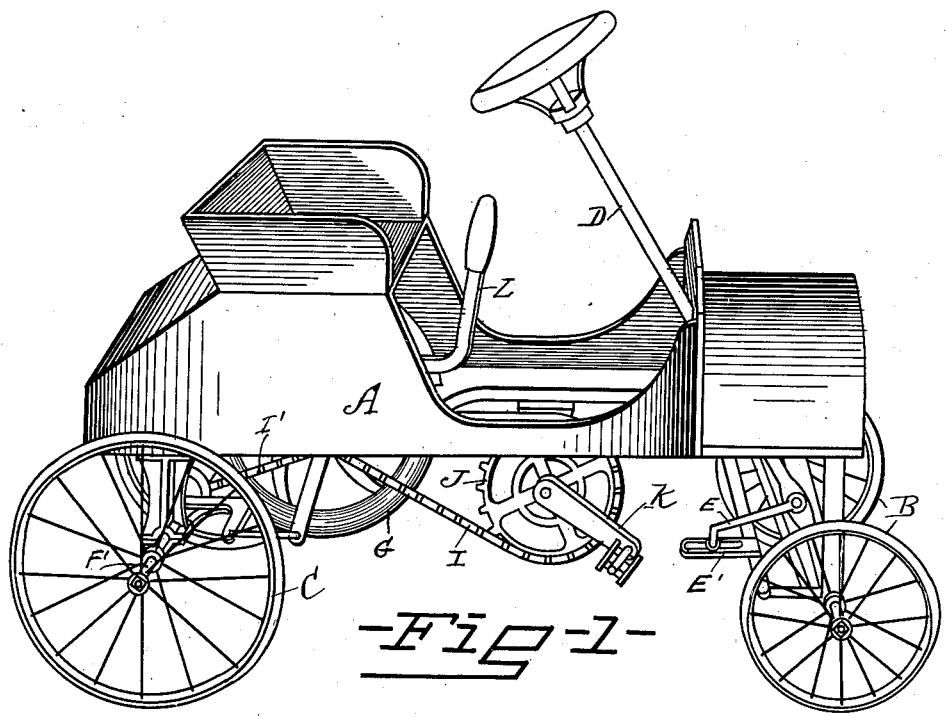

UNITED STATES PATENT OFFICE.

EDWARD R. FOUTS, OF GREENVILLE, OHIO.

MOTOR-VEHICLE.

No. 841,239.      Specification of Letters Patent.      Patented Jan. 15, 1907.

Application filed April 28, 1906. Serial No. 314,255.

*To all whom it may concern:*

Be it known that I, EDWARD R. FOUTS, a citizen of the United States, residing at Greenville, in the county of Darke and State of Ohio, have invented certain new and useful Improvements in Motor-Vehicles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in motor-vehicles of a type especially designed for children and possesses the novel features hereinafter described and claimed.

The object of the invention is to provide a motor-vehicle of the above type in which a maximum amount of power is stored in what may be termed a "power-wheel" and is transmitted from said power-wheel directly to the axle of the carrying-wheels at a point approximately in the middle of said axle.

In order to obtain a direct line of power-transmittal from the crank-shaft to the axle of the carrying-wheels, the power-storage wheel is mounted approximately in line with the wheel on the crank-shaft, and the power is transmitted from the axle of the power-storage wheel at a point adjacent to the axis of said wheel to the axle of the carrying-wheels of the vehicle at a point, as before stated, approximately in the center of the last-named axle.

Preceding a detailed description of the invention reference is made to the accompanying drawings, of which—

Figure 1 is a perspective view of the vehicle. Fig. 2 is a bottom plan view thereof. Fig. 3 is a sectional view on the line *x x* of Fig. 2.

In a detail description of the invention, similar reference characters indicate corresponding parts.

The wagon-body A is of suitable construction, having in mind a requisite lightness and durability, and the floor thereof is provided with suitable openings, as shown in Fig. 2, for the limbs of the occupant to project through to propel the vehicle. The axles F F' of the rear and front wheels C B are mounted in bearings in suitable hangers G', which are bolted to the floor of the vehicle. The front or steering wheels B are guided by a common form of steering-handle D, which connects with a steering-lever E and slotted member E', through which the levers E'', connecting with the knuckle-joints of the axles F', are turned.

The primary power-transmitting chain-wheel J has a short axle M, mounted in bearings in a hanger P, which is attached to the floor of the wagon between the side openings before referred to. This chain-wheel J is approximately nine inches in diameter, and the shaft M thereof has pedal-cranks K fixed thereto and lying below the openings in the bottom of the vehicle, so that power is imparted to said wheel J from the legs of the occupant of the vehicle. Rearward of this chain-wheel J and approximately in line therewith is mounted a power-storage wheel G of approximately thirteen inches in diameter, the position of said wheel being below the seat of the vehicle, where the greatest weight is placed. This power-wheel is mounted upon a short shaft M', which is supported in bearings G', attached to the floor of the vehicle. Upon said shaft there are two chain-wheels R and S, both of which are placed closely to the side of the storage-wheel G, and the latter of which—to wit, S—is in alinement with the wheel J on the crank-shaft. The said wheel S is connected to the wheel J by a chain I, and through such connection power is transmitted to and stored within the power-wheel G when the pedal-cranks K are operated. The power stored in the wheel G is transmitted to the axle of the rear carrying-wheels through a chain I', which surrounds said wheel R on the shaft of the power-wheel, and also a chain-wheel H, which is fixed to a clutch member N on the shaft of said carrying-wheels. The wheel H, through which the power is transmitted to the carrying-wheels, is approximately in line with the wheel J on the crank-shaft and is also approximately in line with the power-wheel, so that the line of power-transmittal is direct from the crank-shaft through the power-wheel to the axle of the carrying-wheels. The diameter of the wheel H on the axle of the carrying-wheels is approximately three and one-half inches. The clutch N is shifted in and out of gear by means of a shifting-lever L' of an angular form and which is connected with an operating-lever L, extending forwardly within the reach of the occupant of the vehicle.

It will be observed that the power stored in the wheel G will be sufficient to propel the vehicle a very considerable distance after the operation of storing said power ceases and that there is no lost power, owing to the connections between the wheels being approximately in a direct line. In the operation of the vehicle the clutch N is normally out of gear, and the power is transmitted to the power-wheel G to the desired extent by driving the pedal-cranks, the vehicle remaining stationary during this period. After a sufficient storage of power has been obtained the clutch is thrown in gear and the vehicle is started from the momentum of the power-wheel.

I claim—

In a vehicle of the type specified, the combination with the vehicle running-gear, of a power-storage wheel mounted upon a short shaft below the vehicle-seat, a primary power-wheel transmitting motion to said power-wheel, said primary power-wheel being on the crank-shaft and having a connection with the shaft of the power-wheel by means of an intermediate transmission-wheel on said power-wheel shaft and adjacent to a side of the power-wheel, a second intermediate transmission-wheel on the shaft of the power-wheel and adjacent to a side of said power-wheel, and a wheel on the shaft of the carrying-wheels in alinement with said second intermediate transmission-wheel, said intermediate transmission-wheels being connected respectively, with the primary power-wheel on the crank-shaft, and the wheel on the shaft of the carrying-wheels, and the line of power-transmittal from said primary wheel being direct from the pedal or crank-shaft to the shaft of the carrying-wheels, as herein shown and described.

In testimony whereof I affix my signature in presence of two witnesses.

EDWARD R. FOUTS.

Witnesses:
   Geo. W. Mannix, Jr.,
   A. L. Baughman.